United States Patent
Wu et al.

(10) Patent No.: US 10,932,100 B2
(45) Date of Patent: Feb. 23, 2021

(54) METHOD, APPARATUS AND CORE NETWORK NODES FOR POLICY AND CHARGING CONTROL

(71) Applicant: Telefonaktiebolaget LM Ericsson (publ), Stockholm (SE)

(72) Inventors: Yi Wu, Beijing (CN); Jian Wang, Beijing (CN); Shunliang Zhang, Beijing (CN)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 232 days.

(21) Appl. No.: 16/088,318

(22) PCT Filed: Apr. 1, 2016

(86) PCT No.: PCT/CN2016/078301
§ 371 (c)(1),
(2) Date: Sep. 25, 2018

(87) PCT Pub. No.: WO2017/166283
PCT Pub. Date: Oct. 5, 2017

(65) Prior Publication Data
US 2020/0304965 A1 Sep. 24, 2020

(51) Int. Cl.
*H04W 4/24* (2018.01)
*H04L 12/14* (2006.01)
(Continued)

(52) U.S. Cl.
CPC ........... *H04W 4/24* (2013.01); *H04L 12/1407* (2013.01); *H04M 15/66* (2013.01); *H04W 16/14* (2013.01)

(58) Field of Classification Search
CPC . H04W 16/14; H04W 72/00; H04W 72/0453; H04W 72/0493; H04W 4/24;
(Continued)

(56) References Cited

U.S. PATENT DOCUMENTS

2013/0159521 A1 6/2013 Marocchi et al.
2015/0133081 A1 5/2015 Griot et al.
(Continued)

FOREIGN PATENT DOCUMENTS

| CN | 101720109 A | 6/2010 |
|---|---|---|
| CN | 104584630 A | 4/2015 |
| WO | 2012142437 A1 | 10/2012 |

OTHER PUBLICATIONS

International Search Report for International application No. PCT/CN2016/078301—dated Dec. 29, 2016.
(Continued)

*Primary Examiner* — Diane D Mizrahi
(74) *Attorney, Agent, or Firm* — Patent Portfolio Builders, PLLC (57) ABSTRACT

The present disclosure relates to methods, apparatus, and core network nodes for policy and charging control. The method includes: generating policy and charging information based, at least, on User Equipment (UE) and Radio Access Network, (RAN) information related to different types of accesses using unlicensed spectrum resource, licensed spectrum resource, and combinations thereof; and performing policy and charging control based on the policy and charging information.

27 Claims, 5 Drawing Sheets

(51) Int. Cl.
*H04M 15/00* (2006.01)
*H04W 16/14* (2009.01)

(58) Field of Classification Search
CPC ... H04W 4/50; H04M 15/66; H04M 15/8214;
H04M 17/00; H04M 17/02; H04M 17/35;
H04M 15/50; H04M 15/60; H04M 15/64;
H04M 15/65; H04M 15/00; H04L
12/1407; H04L 12/14; H04L 67/30
See application file for complete search history.

(56) References Cited

U.S. PATENT DOCUMENTS

2017/0311169 A1* 10/2017 Cai ..................... H04L 5/003
2018/0007212 A1* 1/2018 Sirotkin ............... H04M 15/50
2019/0191035 A1* 6/2019 Vikberg .............. H04L 12/1467

OTHER PUBLICATIONS

Extended European Search Report issued in corresponding EP Application No. 16896063.1 dated Jan. 24 2020, 11 Pages.
Intel Corporation, "Introduction to LTE-WLAN Radio Level Integration and Interworking Enhancement stage-2". 3GPP Draft, 36300_CR0809-(REL-13)_R2-156737-WLAN Running-CR_BEFORE-RAN2-92, vol. RAN WG2, no. Anaheim, Nov. 16, 2015, XP051005498.

* cited by examiner

METHOD, APPARATUS AND CORE NETWORK NODES FOR POLICY AND CHARGING CONTROL

PRIORITY

This nonprovisional application is a U.S. National Stage Filing under 35 U.S.C. § 371 of International Patent Application Serial No. PCT/CN2016/078301 filed Apr. 1, 2016, and entitled "METHOD, APPARATUS AND CORE NETWORK NODES FOR POLICY AND CHARGING CONTROL" which is hereby incorporated by reference in its entirety.

TECHNICAL FIELD

The disclosure generally relates to policy and charging control, and more particularly, to method, apparatus, and core network nodes for policy and charging control.

BACKGROUND

Policy and Charging Control (PCC) is introduced in 3G packet core and evolves continually in 4G packet core for efficient traffic management and charging control. In addition, PCC is extended to manage traffic from WLAN (Wireless Local Area Networks) access. Existing PCC mechanisms are designed for accesses using licensed spectrum resource, such as LTE (Long Term Evolution)/LTE-Advanced (LTE-A) access, and access using unlicensed spectrum resource, such as WLAN access.

As technology develops, diverse applications or services put quite different requirements on future networks. It would be quite difficult or cost impossible to carry various traffic from people and/or machine by a single uniform access network to fulfill such extremely diverse requirements. The existing licensed spectrum is far from enough to provide satisfied user experience and/or cost efficiency. Thus, access technologies utilizing spectrum on a license-exempt basis may continue to play a role in the data traffic management. Recently, there are several new trends in aggregation between the 3rd Generation Partnership Project (3GPP) access and non-3GPP access to fulfill the increasingly diverse requirements to future networks.

In the upcoming 5G Era, mobile network operators will deploy various access networks, e.g. access networks using licensed spectrum resource, access networks using unlicensed spectrum resource, and access networks using both the licensed and unlicensed spectrum resources.

It is desirable to provide a PCC solution for such new heterogeneous access technology environment.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

In a first aspect of the present disclosure, there is provided a method for policy and charging control including: generating policy and charging information based, at least, on User Equipment (UE) and Radio Access Network (RAN) information related to different types of accesses, the different types of accesses using unlicensed spectrum resource, licensed spectrum resource, and combinations thereof; and performing policy and charging control based on the policy and charging information.

In an example, the UE and RAN information related to the different types of accesses may include UE's capability of supporting the different types of accesses and RAN's capability of supporting the different types of accesses.

In an example, the policy and charging information may include: one or more traffic routing rules specifying which traffic is to be routed over any one of the licensed and/or unlicensed spectrum resources of the different types of accesses; and one or more policy and charging rules specifying the policy and charging control for traffic routed over any one of the licensed and/or unlicensed spectrum resources of the different types of accesses.

In an example, said performing policy and charging control based on the policy and charging information may include: forwarding the one or more traffic routing rules to UE, from a core network (CN) node through a RAN node; and enforcing the one or more traffic routing rules at UE, and enforcing the one or more policy and charging rules at a further CN node.

In an example, performing policy and charging control based on the policy and charging information may further include: enforcing the one or more traffic routing rules at the further CN node.

In an example, the different types of accesses using unlicensed spectrum resource, licensed spectrum resource, and combinations thereof may include standalone LTE-Unlicensed (LTE-U), LTE WLAN Aggregation (LWA) and Licensed Assisted Access (LAA).

In an example, the different types of accesses using unlicensed spectrum resource, licensed spectrum resource, and combinations thereof may include standalone LTE-Unlicensed (LTE-U), LTE WLAN Aggregation (LWA) and Licensed Assisted Access (LAA), and the one or more traffic routing rules may specify which traffic is to be routed over any one of standalone LTE-U access, LTE access of LWA, WLAN access of LWA, LTE and WLAN combined access of LWA, licensed bearer of LAA, unlicensed bearer of LAA, and licensed and unlicensed combined bearer of LAA.

In an example, the UE and RAN information related to different types of accesses may be collected by a RAN node and transmitted to a CN node in charge of generating the policy and charging information.

In an example, forwarding the one or more traffic routing rules to UE, from the CN node through the RAN node, may include transmitting, from a Policy and Charging Rules Function (PCRF) node to a Policy and Charging Enforcement Function (PCEF) node, the one or more traffic routing rules, and transmitting from the PCEF node, to the UE through the RAN node, the one or more traffic routing rules.

In an example, enforcing the one or more policy and charging rules at a CN node may include receiving, at a Policy and Charging Enforcement Function (PCEF) node from a Policy and Charging Rules Function (PCRF) node, the one or more policy and charging rules, and enforcing the one or more policy and charging rules at the PCEF node.

In a second aspect of the present disclosure, there is provided an apparatus for policy and charging control including: a generating unit configured to generate policy and charging information based, at least, on User Equipment (UE) and Radio Access Network (RAN) information related to different types of accesses, the different types of accesses using unlicensed spectrum resource, licensed spectrum resource, and combinations thereof; and a performing unit configured to perform policy and charging control based on the policy and charging information.

In an example, the UE and RAN information related to the different types of accesses may include UE's capability of supporting the different types of accesses and RAN's capability of supporting the different types of accesses.

In an example, the policy and charging information may include: one or more traffic routing rules specifying which traffic is to be routed over any one of the licensed and/or unlicensed spectrum resources of the different types of accesses; and one or more policy and charging rules specifying the policy and charging control for traffic routed over any one of the licensed and/or unlicensed spectrum resources of the different types of accesses.

In an example, the performing unit may be configured to perform policy and charging control by forwarding the one or more traffic routing rules to UE, to be enforced therein, through a RAN node and enforcing the one or more policy and charging rules.

In an example, the performing unit may be further configured to perform policy and charging control by also enforcing the one or more traffic routing rules.

In an example, the different types of accesses using unlicensed spectrum resource, licensed spectrum resource, and combinations thereof may include standalone LTE-Unlicensed (LTE-U), LTE WLAN Aggregation (LWA) and Licensed Assisted Access (LAA).

In an example, the different types of accesses using unlicensed spectrum resource, licensed spectrum resource, and combinations thereof may include standalone LTE-Unlicensed (LTE-U), LTE WLAN Aggregation (LWA) and Licensed Assisted Access (LAA), and the one or more traffic routing rules may specify which traffic is to be routed over any one of standalone LTE-U access, LTE access of LWA, WLAN access of LWA, LTE and WLAN combined access of LWA, licensed bearer of LAA, unlicensed bearer of LAA, and licensed and unlicensed combined bearer of LAA.

In an example, the UE and RAN information related to different types of accesses may be collected by a RAN node.

In an example, the generating unit may be a Policy and Charging Rules Function (PCRF) node and the performing unit may be a Policy and Charging Enforcement Function (PCEF) node.

In a third aspect of the present disclosure, there is provided a core network node for generating information for policy and charging control and including: a generator unit configured to generate policy and charging information based, at least, on User Equipment (UE) and Radio Access Network (RAN) information related to different types of accesses, the different types of accesses using unlicensed spectrum resource, licensed spectrum resource, and combinations thereof; and a transmitter configured to transmit the policy and charging information to a further core network node in charge of performing policy and charging control.

In an example, the UE and RAN information related to the different types of accesses may include UE's capability of supporting the different types of accesses and RAN's capability of supporting the different types of accesses.

In an example, the policy and charging information may include: one or more traffic routing rules specifying which traffic is to be routed over any one of the licensed and/or unlicensed spectrum resources of the different types of accesses; and one or more policy and charging rules specifying the policy and charging control for traffic routed over any one of the licensed and/or unlicensed spectrum resources of the different types of accesses.

In an example, the core network node may further include a receiver configured to receive, from a RAN node, the UE and RAN information related to the different types of accesses.

In an example, the core network node may be a Policy and Charging Rules Function (PCRF) node.

In an example, the further core network node may be a Policy and Charging Enforcement Function (PCEF) node.

In a fourth aspect of the present disclosure, there is provided a core network node for performing policy and charging control and including: a receiver configured to receive, from a further core network node in charge of generating information for policy and charging control, policy and charging information based, at least, on User Equipment (UE) and Radio Access Network (RAN) information related to different types of accesses, the different types of accesses using unlicensed spectrum resource, licensed spectrum resource, and combinations thereof; and an enforcer unit configured to perform policy and charging control based on the received policy and charging information.

In an example, the received policy and charging information may include: one or more traffic routing rules specifying which traffic is to be routed over any one of the licensed and/or unlicensed spectrum resources of the different types of accesses; and one or more policy and charging rules specifying the policy and charging control for traffic routed over any one of the licensed and/or unlicensed spectrum resources of the different types of accesses.

In an example, the core network node may further include a transmitter configured to forward, to a UE through a RAN node, the one or more traffic routing rules, and the enforcer unit may be configured to enforce the one or more policy and charging rules.

In an example, the enforcer unit may be further configured to enforce the one or more traffic routing rules.

In an example, the one or more policy and charging rules may be enforced to trigger a flexible charging for traffic over at least one of licensed and unlicensed access spectrum resources.

In an example, the core network node may be a Policy and Charging Enforcement Function (PCEF) node.

In an example, the further core network node may be a Policy and Charging Rules Function (PCRF) node.

BRIEF DESCRIPTION OF THE DRAWINGS

The above and other objects, features and advantages of the present disclosure will be clear from the following detailed description about the non-limited embodiments of the present disclosure taken in conjunction with the accompanied drawings, in which.

DETAILED DESCRIPTION OF EMBODIMENTS

In the following detailed description, reference is made to the accompanying drawings, which form a part thereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the scope of the subject matter presented here. It will be readily understood that aspects of this disclosure, as generally described herein, and illustrated in the figures, can be arranged, substituted, combined, and designed in a wide variety of different configurations, all of which are explicitly contemplated and make part of this disclosure.

In the upcoming 5G Era, mobile network operators will deploy various access networks using licensed spectrum resource, unlicensed spectrum resource, and/or combinations thereof. Examples of such access networks include, but not limited to, access networks using licensed spectrum resource (e.g. 5G new-Radio Access Technology (new-RAT) and LTE/LTE-A), access networks using unlicensed spectrum resource (e.g. WLAN and standalone LTE-U), and access networks using both the licensed and unlicensed spectrum resources (e.g. LWA and LAA).

3GPP has introduced several interworking solutions between 3GPP networks and WLAN in previous releases. These enable moving data bearers to WLAN where the 3GPP core network (CN) acts as the anchor point, and the decisions for selecting WLAN are mostly carried out by policies in the user terminal. In Rel-12, 3GPP also introduced RAN rules and assistance which help in making better traffic steering decisions, with more RAN control. In Rel-13, a Work Item has been approved and is aimed at improving LTE-WLAN Radio Level Integration and Interworking.

Figure 1:
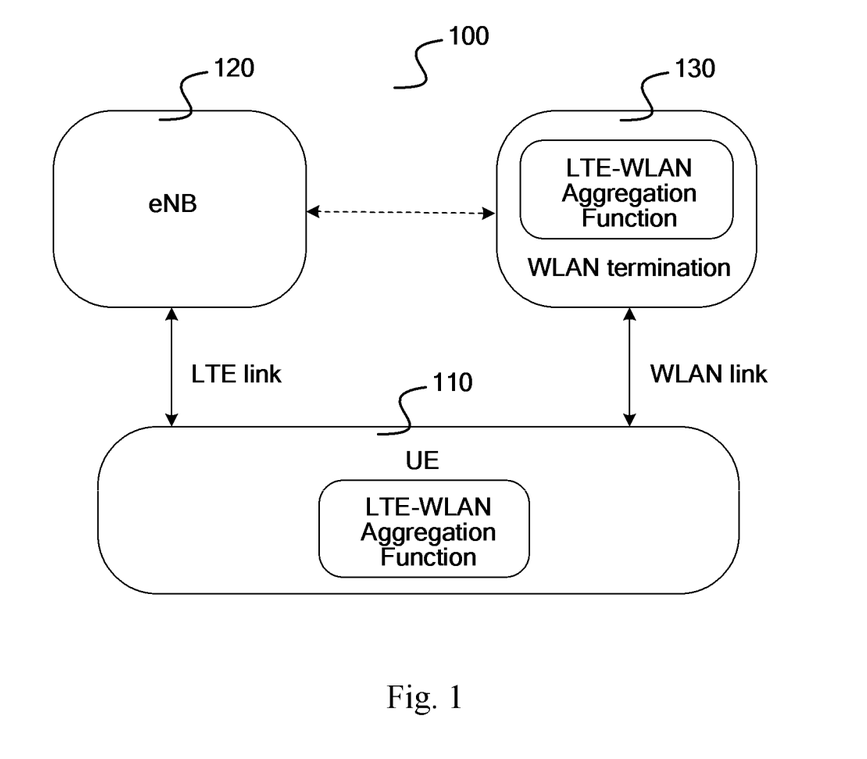
FIG. 1 is a schematic diagram illustrating LWA architecture.

FIG. 1 is a schematic diagram illustrating LWA architecture 100. As shown in FIG. 1, there are licensed spectrum resource over which e.g. a LTE link between eNB 120 and UE 110 is established and unlicensed spectrum resource over which e.g. a WLAN link between WLAN termination 130 and the UE 110 is established. Each of the UE and the WLAN termination has a respective LWA function block. LWA introduces data aggregation where a data bearer can be served by the LTE link and/or WLAN link. Particularly, in addition to Master Cell Group (MCG) bearer carried by LTE spectrum resource and switched bearer carried by WLAN spectrum resource, LWA supports split bearer operation on downlink in which a bearer is configured to use both LTE and WLAN spectrum resources. For split bearer operation, Packet Data Convergence Protocol (PDCP) sublayer supports in-sequence delivery of upper layer Protocol Data Units (PDUs) based on dual connectivity reordering procedure. LWA supports transmission of uplink PDCP PDUs on LTE. Accordingly, the LWA architecture 100 provides a better control and utilization of both the licensed and unlicensed spectrum resources and increases the aggregate throughput and system capacity. It is supposed to be transparent to CN and will be built upon the 3GPP Rel-12 Dual Connectivity split-bearer framework.

LWA may have different deployments, such as separated LTE and WLAN deployment with WLAN termination implemented by Access Point (AP), separated LTE and WLAN deployment with WLAN termination implemented by Access Controller (AC), and collocated LTE and WLAN deployment.

Besides leveraging WLAN access technology, the industry is considering to extend LTE access technology to unlicensed spectrum resource as well. Two different access technologies are under discussion, e.g. LTE-U/LAA and standalone LTE-U.

Figure 2:
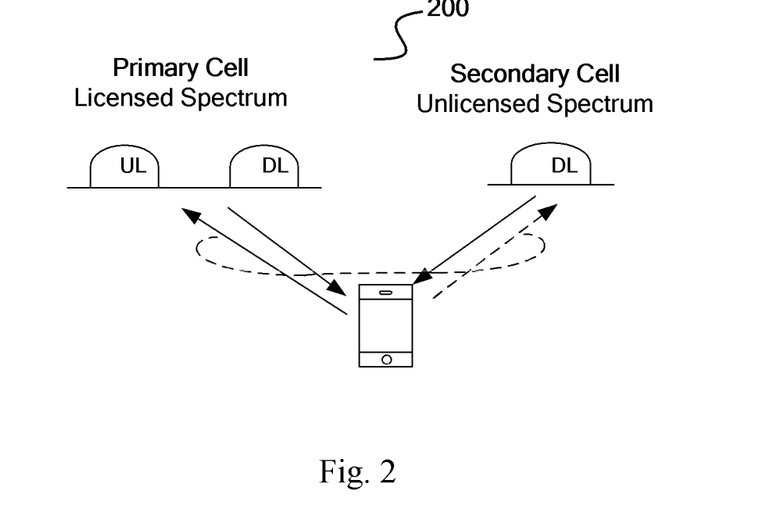
FIG. 2 is a schematic diagram illustrating LAA access.

FIG. 2 is a schematic diagram illustrating LAA access 200. In LAA, unlicensed spectrum resource is used as performance booster managed by licensed spectrum resource. The existing carrier aggregation framework used among licensed carriers is reused and extended to unlicensed carriers. Since the reliability of licensed spectrum resource may be different from the reliability of unlicensed spectrum resource, information with different reliability requirements may be put on unlicensed and licensed bearers differently. Generally, licensed spectrum Primary Cell (Uplink (UL) and Downlink (DL)) is considered as appropriate for reliable control signaling, mobility management signaling, as well as robust/real-time user data with strict LTE Quality Of Service (QoS) requirement, while unlicensed spectrum Secondary Cell is considered as appropriate for best effort data, and it can be DL-only.

Figure 3:
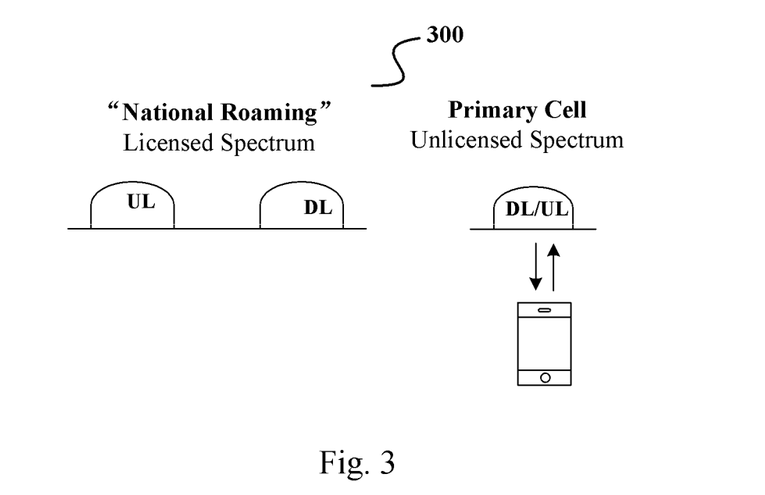
FIG. 3 is a schematic diagram illustrating standalone LTE-U access.

FIG. 3 is a schematic diagram illustrating standalone LTE-U access 300. As shown in FIG. 3, traffic may be routed over unlicensed spectrum resource (DL/UL). Standalone LTE-U is another alternative to extend LTE technology to unlicensed spectrum. In contrast to LTE-U/LAA, the standalone LTE-U can be operated independently with any licensed access technology or assistance. Therefore, it could be Mobile Network Operator (MNO) independent deployment and operation, while it could fall back to MNO network (both UL and DL) at coverage loss or national/international roaming situation. The standalone LTE-U is targeted to compete with independent WLAN access technology. Given that standalone LTE-U is operated totally in unlicensed spectrum resource, it may have lower QoS than LTE or LAA, while its cost can be much lower than LTE or LAA.

In a network environment where various access networks such as standalone LTE-U, LWA and LAA as described above as well as 5G new-RAT, LTE/LTE-A, and WLAN etc. are deployed, the existing PCC solutions encounter some problems.

For example, LAA can use unlicensed spectrum resource in addition to licensed spectrum resource, i.e. certain carrier is operated in unlicensed spectrum, so that it cannot be protected against interference from other unlicensed spectrum resource users. If mission critical Machine-Type Communications (MTC) traffic is carried by such carrier, service quality may not be well guaranteed at certain condition. However traditional LTE is operated in licensed spectrum with good radio resource guarantee. It is unfair to apply the existing PCC solutions to charge a user with the same rate regardless traffic is routed over unlicensed spectrum resource, licensed spectrum resource, or combination thereof. Standalone LTE-U is totally operated in unlicensed spectrum, where almost no spectrum resource can be guaranteed. This is completely different from traditional LTE, so that the existing PCC solutions are not suitable for standalone LTE-U. In LWA, WLAN and LTE are aggregated seamlessly from radio level for better user experience, radio resource utilization and less interference. WLAN access of LWA is different from traditional WLAN access, e.g. standalone or integrated with Evolved Packet Core (EPC) by S2a, S2b or S2c interface. That is, the same IP traffic flow can be conveyed by LTE access and WLAN access simultaneously in LWA, which is not possible in any of the traditional accesses such as LTE/LTE-A and WLAN. These differences are not considered in any of the existing PCC solutions.

A specific scenario is assumed for illustration, where new access technology like LWA is deployed and supported by UE, while PCRF at network side isn't aware of such situation and couldn't differentiate between traditional WLAN access and WLAN access of LWA, and then the PCRF doesn't prioritize WLAN access of LWA over traditional WLAN access in network discovery information provided to UE. If traffic is routed over traditional WLAN access instead of WLAN access of LWA, user experience may be scarified during Hand Over (HO) to LTE or other WLAN AP. Furthermore, it is unfair to apply the existing PCC solutions to charge a user with the same rate regardless of the traffic is routed over WLAN access of LWA or traditional WLAN access. Furthermore, if PCRF doesn't know that UE supports LWA and the LWA network is available, traffic can only be steered to traditional WLAN bearer or LTE bearer. In this case, no traffic can be conveyed by split bearer operation, i.e. over LTE bearer and WLAN bearer simultaneously, and the dual connection capability will be wasted. Similarly, as compared to traditional LTE operated in licensed spectrum, standalone LTE-U or LAA operated fully or partially in unlicensed spectrum may not guarantee the same level of user experience. Licensed and unlicensed spectrum means big difference to network operators from economic perspective. It would be problematic to perform policy and charging control with the same rules regardless of licensed spectrum based LTE access and unlicensed spectrum based LTE access.

Embodiments of the present disclosure provide methods, apparatus and core network nodes for policy and charging control, in order to adapt the policy and charging control to a network environment in which different types of accesses networks using unlicensed spectrum resource, licensed spectrum resource, and combinations thereof, e.g. standalone LTE-U, LWA and LAA, are deployed.

Figure 4:
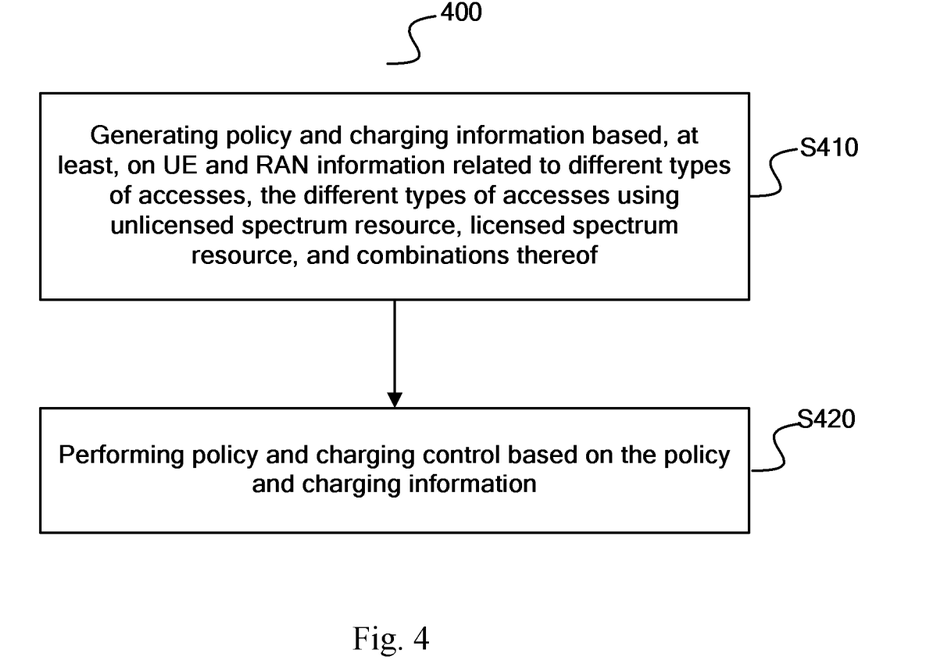
FIG. 4 is a flow chart illustrating a method for policy and charging control according to an embodiment of the present disclosure.

FIG. 4 is a flow chart illustrating a method 400 for policy and charging control according to an embodiment of the present disclosure.

At step S410, policy and charging information is generated based, at least, on UE and RAN information related to different types of accesses using unlicensed spectrum resource, licensed spectrum resource, and combinations thereof.

In an embodiment, the UE and RAN information related to the different types of accesses may include UE's capability of supporting the different types of accesses and RAN's capability of supporting the different types of accesses.

In an embodiment, the different types of accesses using unlicensed spectrum resource, licensed spectrum resource, and combinations thereof may include: standalone LTE-U, LWA and LAA.

In an embodiment, the policy and charging information may include: one or more traffic routing rules specifying which traffic is to be routed over any one of the licensed and/or unlicensed spectrum resources of the different types of accesses; and one or more policy and charging rules specifying the policy and charging control for traffic routed over any one of the licensed and/or unlicensed spectrum resources of the different types of accesses. In an embodiment, the different types of accesses using unlicensed spectrum resource, licensed spectrum resource, and combinations thereof may include: standalone LTE-U, LWA and LAA, and the one or more traffic routing rules may specify which traffic is to be routed over any one of standalone LTE-U access, LTE access of LWA, WLAN access of LWA, LTE and WLAN combined access of LWA, licensed bearer of LAA, unlicensed bearer of LAA, and licensed and unlicensed combined bearer of LAA.

In an embodiment, the UE and RAN information related to different types of accesses may be collected by the RAN node and transmitted to a CN node in charge of generating the policy and charging information. This enables the network side to be aware of the UE and RAN capability of supporting the different types of accesses. For example, if LWA is deployed and supported by UE, the network side will be aware of such situation. As such, traffic can be conveyed by split bearer operation when necessary, thereby the dual connection capability will not be wasted.

At step S420, policy and charging control is performed based on the policy and charging information.

In an embodiment, this step S420 may include: forwarding the one or more traffic routing rules to UE, from a core network node through a RAN node; and enforcing the one or more traffic routing rules at UE, and enforcing the one or more policy and charging rules at a further CN node.

As an example, forwarding the one or more traffic routing rules to UE, from the CN node through the RAN node, may include: transmitting, from a PCRF node to a PCEF node, the one or more traffic routing rules, and transmitting from the PCEF node to the UE through the RAN node, the one or more traffic routing rules.

As an example, enforcing the one or more policy and charging rules at a further CN node may include receiving, at a PCEF node from a PCRF node, the one or more policy and charging rules, and enforcing the one or more policy and charging rules at the PCEF node.

In an embodiment, this step S420 may further include: enforcing the one or more traffic routing rules at the further CN node.

In contrast to the existing PCC solutions, which charge a user with the same rate regardless of the traffic is routed over licensed or unlicensed spectrum resource, embodiments of the present disclosure take account of UE and RAN information related to different types of accesses using unlicensed spectrum resource, licensed spectrum resource, and combinations thereof when generating policy and charging information. Accordingly, differences between unlicensed spectrum resource, licensed spectrum resource, and combinations thereof of the different types of accesses are considered in policy and charging control. This enables the embodiments of the present disclosure to provide a flexible policy and charging control in a network environment in which different types of accesses networks using unlicensed spectrum resource, licensed spectrum resource, and combinations thereof, e.g. standalone LTE-U, LWA and LAA, are deployed.

Figure 5:
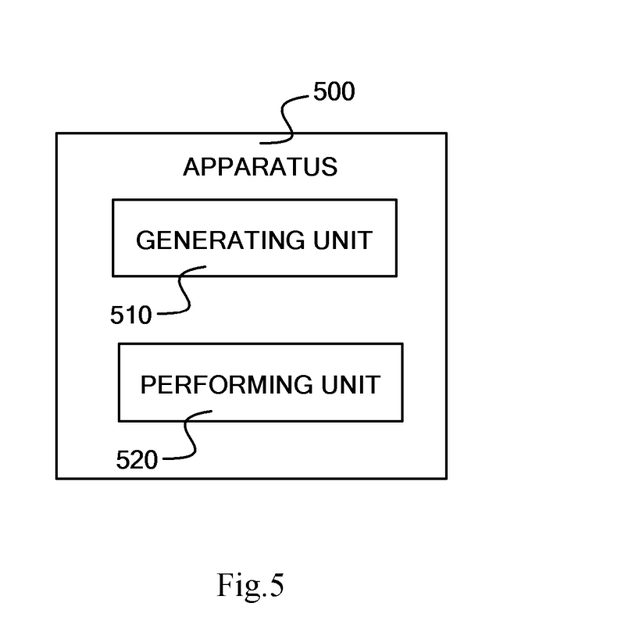
FIG. 5 is a block diagram illustrating an apparatus for policy and charging control according to an embodiment of the present disclosure.

FIG. 5 is a block diagram illustrating an apparatus 500 for policy and charging control according to an embodiment of the present disclosure.

Referring to FIG. 5, the apparatus 500 may include a generating unit 510 and a performing unit 520.

The generating unit 510 may be configured to generate policy and charging information based, at least, on UE and RAN information related to different types of accesses using unlicensed spectrum resource, licensed spectrum resource, and combinations thereof.

In an embodiment, the UE and RAN information related to the different types of accesses may include UE's capability of supporting the different types of accesses and RAN's capability of supporting the different types of accesses.

In an embodiment, the different types of accesses using unlicensed spectrum resource, licensed spectrum resource, and combinations thereof may include standalone LTE-U, LWA and LAA.

In an embodiment, the policy and charging information may include: one or more traffic routing rules specifying which traffic is to be routed over any one of the licensed and/or unlicensed spectrum resources of the different types of accesses; and one or more policy and charging rules specifying the policy and charging control for traffic routed over any one of the licensed and/or unlicensed spectrum resources of the different types of accesses. In an embodiment, the different types of accesses using unlicensed spectrum resource, licensed spectrum resource, and combinations thereof may include standalone LTE-U, LWA and LAA, and the one or more traffic routing rules may specify which traffic is to be routed over any one of standalone LTE-U access, LTE access of LWA, WLAN access of LWA, LTE and WLAN combined access of LWA, licensed bearer of LAA, unlicensed bearer of LAA, and licensed and unlicensed combined bearer of LAA.

In an embodiment, the UE and RAN information related to different types of accesses may be collected by a RAN node and may reach the generating unit 510.

In an embodiment, the generating unit 510 may be a PCRF node.

The performing unit 520 may be configured to perform policy and charging control based on the policy and charging information.

In one embodiment, the performing unit 520 may be configured to perform policy and charging control by forwarding the one or more traffic routing rules to UE, to be enforced therein, through a RAN node and enforcing the one or more policy and charging rules. In one embodiment, the performing unit 520 may be further configured to perform policy and charging control by also enforcing the one or more traffic routing rules.

In one embodiment, the performing unit 520 may be a PCEF node.

Figure 6:
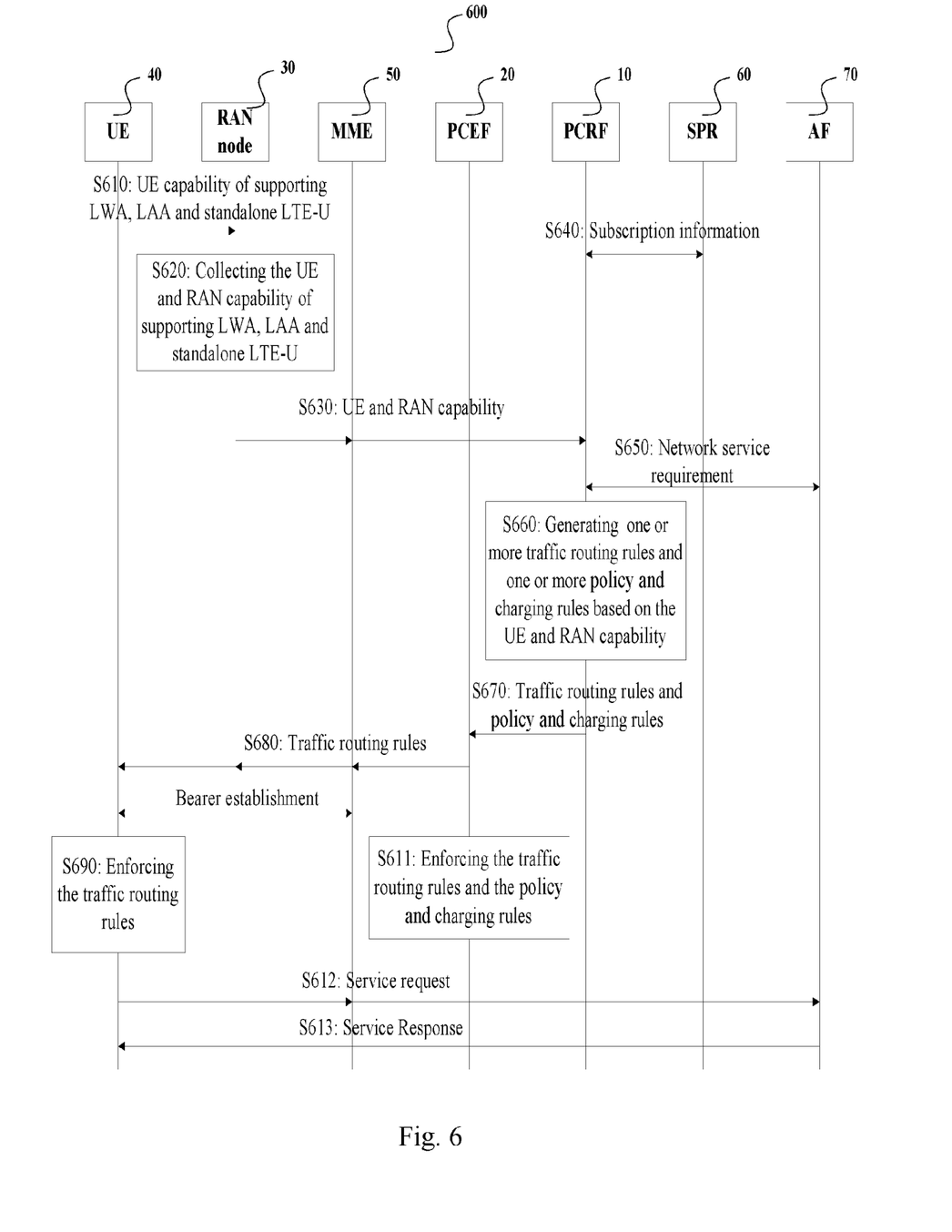
FIG. 6 is a diagram illustrating a policy and charging control process according to an embodiment of the present disclosure.

FIG. 6 is a diagram illustrating a policy and charging control process 600 according to an embodiment of the present disclosure. In this embodiment, the process 600 is performed in a network environment in which different types of accesses networks using unlicensed spectrum resource, licensed spectrum resource, and combinations thereof may be deployed. In this embodiment, said different types of accesses networks include, but not limited to, standalone LTE-U, LWA and LAA as described above. Any other access networks such as 5G new-RAT, LTE/LTE-A, and WLAN may also be deployed. As shown in FIG. 6, this network environment involves UE 40, RAN node 30, and CN nodes including Mobility Management Entity (MME) 50, PCEF 20, PCRF 10, Subscription Profile Repository (SPR) 60, and Application Function (AF) 70.

At step S610, UE 40 reports its capability of supporting LWA, LAA and standalone LTE-U to the RAN node 30.

As an example, UE 40 may report its capability of supporting LWA, LAA and standalone LTE-U to the RAN node 30 by a message during connection establishment process. The message may include LWA capability indication, LAA capability indication, and LTE-U capability indication associated to UE 40. The RAN node 30 may be implemented by a RAN Control-Plane (C-plane) function such as eNB.

At step S620, the RAN node 30 collects the UE and RAN capability of supporting LWA, LAA and standalone LTE-U.

As an example, the RAN node 30 may store the UE capability of supporting LWA, LAA and standalone LTE-U reported by UE 40, and determine its RAN capability of supporting LWA, LAA and standalone LTE-U. In an example, the RAN node 30 may further measure radio load status or radio resource utilization on licensed spectrum and/or unlicensed radio spectrum supported by RAN.

At step S630, the RAN node 30 transmits the collected UE and RAN capability of supporting LWA, LAA and standalone LTE-U to PCRF 10.

In an embodiment, the RAN node 30 may transmit the collected UE and RAN capability of supporting LWA, LAA and standalone LTE-U to a PCRF node 10 via a CN C-plane function such as MME 50.

As an example, the RAN node 30 may report the collected UE and RAN capability of supporting LWA, LAA and standalone LTE-U to the MME 50 by a message including UE capability indication on standalone LTE-U, LAA and LWA and RAN capability indication on standalone LTE-U, LAA, and LWA. The message may further include load status and/or radio resource utilization on licensed and/or unlicensed radio spectrum supported by RAN.

MME 50 may forward the UE and RAN capability of supporting LWA, LAA and standalone LTE-U received from the RAN node 30 to PCRF 10 by a message. In an example, the message may be sent from MME 50 to PCRF 10 directly. Alternatively, the message may be relayed to PCRF 10 by intermediate CN C-Plane and/or User-Plane (U-plane) function such as Serving Gateway/PDN Gateway (S/P-GW). In this case, the related interface between MME and S/P-GW, and interface between S/P-GW and PCRF may be extended to convey UE and RAN capability of supporting LWA, LAA and standalone LTE-U, and the load status and/or radio resource utilization on licensed and/or unlicensed radio spectrum supported by RAN.

At step S640, PCRF 10 may interact with SPR 60 to obtain user subscription information on utilization of standalone LTE-U, LWA, and LAA access networks.

At step S650, PCRF 10 may interact with AF 70, which may be operated by an Over-The-Top Service Provider (OTT SP), as indicated in user related information to obtain a network service requirement on various access networks, such as standalone LTE-U, LWA, LAA, to convey traffic.

As an example, the network service requirement may be obtained from AF 70 directly or indirectly through intermediate function such as Service Creation Environment Function (SCEF).

In an example, AF may reply to PCRF 10, likely through an Access Network Discovery and Selection Function (ANDSF), network service requirement such as preference/ requirement of OTT SP on network selection. For example, the preference/requirement may include a list of preferred access networks, associated traffic service description information, and related UE ID/IP information.

At step S660, PCRF 10 generates one or more traffic routing rules and one or more policy and charging control rules based, at least, on UE and RAN capability of supporting different types of accesses such as LWA, LAA and standalone LTE-U.

For example, the one or more traffic routing rules and the one or more policy and charging control rules may be generated based on the UE and RAN capability of supporting the different types of accesses such as LWA, LAA and standalone LTE-U and the radio load status and/or radio resource utilization on licensed spectrum and/or unlicensed radio spectrum supported by RAN, operator policy on utilization of the unlicensed and licensed spectrum resources of the different types of accesses, the subscription information obtained from SPR 60 in step S640 and/or the network service requirement obtained from AF 70 in step S650.

In an example, the one or more traffic routing rules specify which traffic is to be routed over any one of the licensed and/or unlicensed spectrum resources of different types of accesses such as LWA, LAA and standalone LTE-U. For example, besides traditional accesses such as LTE/LTE-A and WLAN, PCRF 10 can determine specific traffic to be routed over standalone LTE-U access, specific traffic to be routed over LTE access of LWA, specific traffic to be routed over WLAN access of LWA, specific traffic to be routed over LTE and WLAN combined access of LWA, specific traffic to be routed over licensed bearer of LAA, specific traffic to be routed over unlicensed bearer of LAA, and specific traffic to be routed over licensed and unlicensed combined bearer of LAA.

With such traffic routing rules, traffic can be routed in a flexible manner among the licensed and/or unlicensed spectrum resources of the different types of accesses. For example, if LWA is deployed and supported by UE, PCRF at network side will be aware of such situation and can differentiate between traditional WLAN access and WLAN access of LWA, so that PCRF can prioritize WLAN access of LWA over traditional WLAN access in network discovery information provided to UE to provide a better user experience. As another example, mission critical MTC traffic may be not allowed to be routed over unlicensed spectrum resource of LAA in order to guarantee the service quality.

Accordingly, traffic routed over accesses such as LWA, LAA and standalone LTE-U can be charged separately and/or differently from traffic routed over traditional accesses such as LTE/LTE-A and WLAN.

In an example, the one or more policy and charging rules specify the policy and charging control for traffic routed over any one of the licensed and/or unlicensed spectrum resources of the different types of accesses.

For examples, the one or more policy and charging rules may specify:

1) according to the operator policy and the UE capability of supporting different types of accesses such as LWA, LAA and standalone LTE-U, traffic related to a predefined Application (APP) may be routed over unlicensed LTE access, e.g. standalone LTE-U, and charged by a very low rate or free of charge; and traffic related to another predefined APP will be carried by any one of the licensed bearer of LAA, unlicensed bearer of LAA, and licensed and unlicensed combined bearer of LAA, and charged with high rate and most strictly controlled data rate or QoS;

2) according to requirements of OTT operators, traffic related to a predefined group of users involved in the OTT service may be routed over licensed LTE access with strictly controlled data rate or QoS control, and charged with high rate; and traffic related to another predefined group of users involved in the OTT may be routed over unlicensed LTE access, e.g. standalone LTE-U, which is free of data rate or QoS control and charge;

3) according to UE capability of supporting different types of accesses such as LWA, LAA and standalone LTE-U and the radio access network situation such as the radio load status and/or radio resource utilization on licensed spectrum and/or unlicensed radio spectrum supported by RAN, if LWA is supported by UE and available, WLAN access of LWA is prioritized over independent WLAN access to carry traffic for a predefined user, and this traffic is less strictly controlled than traffic over LTE access of the LWA, and charged with lower rate than traffic over LTE access of LWA, and if LTE-U is supported by UE and available, LTE-U is prioritized over licensed LTE to carry traffic for another predefined user, and this traffic is less strictly controlled than traffic over licensed LTE access, and charged with lower rate than traffic over licensed LTE access.

With such policy and charging rules, policy and charging control may be performed differently for traffic routed over the licensed and/or unlicensed spectrum resources of the different types of accesses. For example, traffic routed over standalone LTE-U may be charged by a very low rate or free of charge. As another example, traffic routed over licensed LTE access may be charged with high rate and constrained at a strictly controlled data rate or QoS. This is more flexible and reasonable than the existing policy and charging control solutions which charge a user with the same rate without considering the difference between licensed spectrum resource, unlicensed spectrum resource, and combination thereof.

At step S670, PCRF 10 provides the one or more traffic routing rules and the one or more policy and charging rules to PCEF 20.

As an example, PCRF 10 may provide the one or more traffic routing rules and the one or more policy and charging rules to PCEF 20 by a response message which may include following information:

1) one or more traffic routing rules, in which for routing access information, the following new values are defined: standalone LTE-U access, LTE access of LWA, WLAN access of LWA, LTE and WLAN combined access of LWA, licensed bearer of LAA, unlicensed bearer of LAA, and licensed and unlicensed combined bearer of LAA;

2) one or more policy and charging rules, in which following new value or indicator is defined for user location report: LWA indicator or both LWA involved LTE cell info and LWA involved WLAN SSID info to be reported to inform PCRF that the access is LWA supported; for allowed access type, the following new values are defined: e.g. standalone LTE-U access, LTE access of LWA, WLAN access of LWA, LTE and WLAN combined access of LWA, licensed bearer of LAA, unlicensed bearer of LAA, licensed and unlicensed combined bearer of LAA; and separated and/or different charging key values can be defined for traffic over different types of accesses, e.g. standalone LTE-U, LWA, and LAA.

In addition, the message may include 3) IP-CAN bearer and/or session related policy in which for default network based IP flow management (NBIFOM) access, following values are defined: standalone LTE-U access, LTE access of LWA, WLAN access of LWA, both LTE and WLAN access of LWA, LAA access.

At step S680, PCEF 20 forwards the one or more traffic routing rules to UE 40 through the RAN node 30. For example, the PCEF 20 forwards the one or more traffic routing rules to MME 50, MME 50 sends a message including the one or more traffic routing rules to the RAN node 30 to confirm related information has been received, the RAN node 30 replies the UE 40 with a message to confirm related information has been received, and MME 50 forwards the one or more traffic routing rules to UE 40 by a Non-Access Stratum (NAS) message which is extended to convey enhanced traffic routing rule. In an alternative embodiment, the one or more traffic routing rules may be provided directly to the RAN node 30 from PCRF 10 and forwarded from the RAN node 30 to UE 40.

After the traffic routing rules are forwarded to UE 40, bearer is established between UE and CN, as shown in FIG. 6.

At step S690, UE 40 enforces the one or more traffic routing rules.

In an example, based on the received traffic routing rules and/or the UE local settings, UE 40 may accept the traffic routing rules and steer traffic over the licensed and/or unlicensed spectrum resources of the different types of accesses, e.g. standalone LTE-U, LWA and LAA, in accordance with the traffic routing rules.

For example, UE 40 may distribute upper layer user traffic among available licensed and/or unlicensed spectrum resources of the different types of accesses. Particularly, certain user traffic may be steered to standalone LTE-U access, certain user traffic may be steered to primary carriers of LAA, certain user traffic may be steered to secondary carriers of LAA, certain user traffic may be steered to LTE access of LWA, certain user traffic may be steered to WLAN access of LWA, and certain user traffic may be steered to LTE and WLAN combined access of LWA.

By forwarding the one or more traffic routing rules to UE, from a CN node through a RAN node and enforcing the one or more traffic routing rules at UE, the flexible and reasonable traffic routing may be achieved.

At step S611, PCEF 20 may enforce the one or more traffic routing rules and enforces the one or more policy and charging rules. For example, a CN U-plane function such as S/P-GW (in which PCEF 20 may be located) in EPC may intercept the user traffic and enforce the policy and charging rule to realize a flexible charging for traffic over licensed and/or unlicensed spectrum resource of the different types of accesses, e.g. standalone LTE-U, LWA and LAA, and then the traffic may be routed continually to an application server.

By enforcing the one or more traffic routing rules also at the CN node such as PCEF 20, traffic not complying with the traffic routing rules may be blocked or otherwise not allowed, in order to provide a stricter traffic routing.

At step S612, UE 40 sends a service request such as HTTP request to AF 70 through bearers or tunnels established between UE 40 and CN.

At step S613, AF 70 provides a service response to UE 40. For example, the application server may provide an application layer response message to UE 40, and an OTT service may be provided to the UE 40.

It should be noted that the order in which the steps may be performed is not limited to the order as described above. In some embodiments, step S640 may be performed before step S630 and step S650 may be performed after step S630, as shown in FIG. 6. In some embodiments, step S611 may be performed before step S690. In some embodiments, steps S611 and S690 may be simultaneously.

Figure 7:
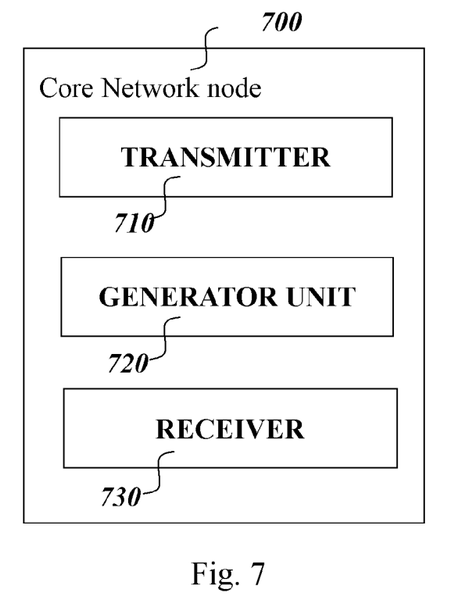
FIG. 7 is a block diagram illustrating a core network node for generating information for policy and charging control according to an embodiment of the present disclosure.

FIG. 7 is a block diagram illustrating a core network node 700 for generating information for policy and charging control according to an embodiment of the present disclosure.

Figure 8:
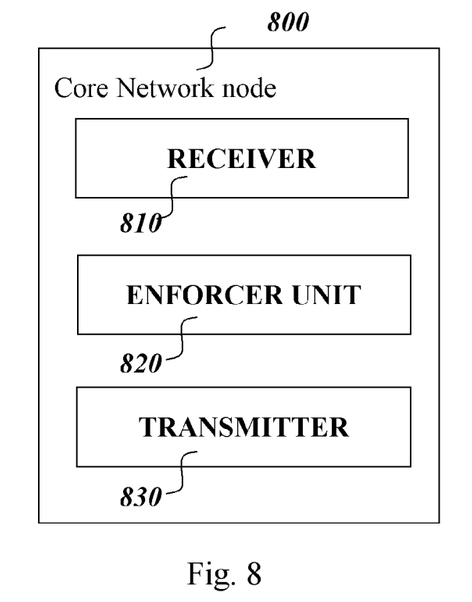
FIG. 8 is a block diagram illustrating a core network node for performing policy and charging control according to an embodiment of the present disclosure.

Referring to FIG. 7, the core network node 700 may include a generator unit 720 and a transmitter 710. The generator unit 720 may be configured to generate policy and charging information based, at least, on UE and RAN information related to different types of accesses, the different types of accesses using unlicensed spectrum resource, licensed spectrum resource, and combinations thereof. The transmitter 710 may be configured to transmit the policy and charging information to a further core network node 800 in charge of performing policy and charging control, as illustrated in FIG. 8. In an embodiment, the further core network node 800 may be a PCEF node 20.

In an embodiment, the UE and RAN information related to the different types of accesses may include UE's capability of supporting the different types of accesses and RAN's capability of supporting the different types of accesses.

In an embodiment, the policy and charging information may include: one or more traffic routing rules specifying which traffic is to be routed over any one of the licensed and/or unlicensed spectrum resources of the different types of accesses; and one or more policy and charging rules specifying the policy and charging control for traffic routed over any one of the licensed and/or unlicensed spectrum resources of the different types of accesses.

In an embodiment, the core network node 700 may further include a receiver 730 configured to receive, from a RAN node, the UE and RAN information related to the different types of accesses.

In an embodiment, the core network node 700 may be a PCRF node 10.

FIG. 8 is a block diagram illustrating a core network node 800 for performing policy and charging control according to an embodiment of the present disclosure.

Referring to FIG. 8, the core network node 800 may include a receiver 810 and an enforcer unit 820. The receiver 810 may be configured to receive, from a further core network node 700 in charge of generating information for policy and charging control and illustrated in FIG. 7, policy and charging information based, at least, on UE and RAN information related to different types of accesses using unlicensed spectrum resource, licensed spectrum resource, and combinations thereof. In an embodiment, the further core network node 700 may be a PCRF node 10. The enforcer unit 820 may be configured to perform policy and charging control based on the received policy and charging information.

In an embodiment, the received policy and charging information may include: one or more traffic routing rules specifying which traffic is to be routed over any one of the licensed and/or unlicensed spectrum resources of the different types of accesses; and one or more policy and charging rules specifying the policy and charging control for traffic routed over any one of the licensed and/or unlicensed spectrum resources of the different types of accesses.

In an embodiment, the core network node 800 may further include a transmitter 830 configured to forward, to UE through a RAN node, the one or more traffic routing rules, wherein the enforcer unit 820 may be configured to enforce the one or more policy and charging rules.

In an embodiment, the enforcer unit 820 may be further configured to enforce the one or more traffic routing rules.

In an embodiment, the one or more policy and charging rules are enforced to trigger a flexible charging for traffic over at least one of licensed and unlicensed access spectrum resources.

In an embodiment, the core network node 800 may be a PCEF node 20.

According to a further aspect of the present disclosure, there is provided a computer program product comprising instructions that, in response to execution of the instructions by a computing device, cause the computing device to perform any of the steps or embodiments of the method described above. According to a still further aspect of the present disclosure, there is provided a non-transitory computer readable medium comprising instructions that, in response to execution of the instructions by a computing device, cause the computing device to perform any of the steps or embodiments of the method described above.

Embodiments of the present disclosure are applicable for various access networks which include not only the traditional LTE/LTE-A and WLAN, but also standalone LTE-U, LWA and LAA. They are in line with the existing 3GPP network architecture, e.g. PCC framework, and can be evolved to be in line with 5G radio access networks.

Embodiments of the present disclosure can be implemented in a simple and feasible manner on the basis of the existing network architecture, e.g. by enhancing the existing interfaces and network functions.

The foregoing description gives only the embodiments of the present disclosure and is not intended to limit the present disclosure in any way. Thus, any modification, substitution, improvement or the like made within the teaching and principle of the present disclosure should be encompassed by the scope of the present disclosure.

The invention claimed is:

1. A method for policy and charging control, the method comprising:
   generating policy and charging information based, at least, on User Equipment (UE) and Radio Access Network (RAN) information related to different types of accesses, the different types of accesses using an unlicensed spectrum resource, a licensed spectrum resource, and a combination thereof, wherein the UE and RAN information related to the different types of accesses comprises capability of a UE for supporting the different types of accesses and capability of a RAN for supporting the different types of accesses; and
   performing the policy and charging control based on the policy and charging information.

2. The method of claim 1, wherein the policy and charging information comprises:
   one or more traffic routing rules specifying which traffic is to be routed over any one of the licensed spectrum resource and/or the unlicensed spectrum resource of the different types of accesses; and
   one or more policy and charging rules specifying the policy and charging control for the traffic routed over any one of the licensed spectrum resource and/or the unlicensed spectrum resource of the different types of accesses.

3. The method of claim 2, wherein said performing policy and charging control, based on the policy and charging information, comprises:
   forwarding the one or more traffic routing rules to the UE, from a core network (CN) node through a RAN node; and
   enforcing the one or more traffic routing rules at the UE, and enforcing the one or more policy and charging rules at a further CN node.

4. The method of claim 3, wherein said performing policy and charging control, based on the policy and charging information, further comprises:
   enforcing the one or more traffic routing rules at the further CN node.

5. The method of claim 3, wherein forwarding the one or more traffic routing rules to the UE, from the CN node through the RAN node, comprises transmitting, from a Policy and Charging Rules Function (PCRF) node to a Policy and Charging Enforcement Function (PCEF) node, the one or more traffic routing rules, and transmitting from the PCEF node, to the UE through the RAN node, the one or more traffic routing rules.

6. The method of claim 3, wherein enforcing the one or more policy and charging rules at the further CN node comprises receiving, at a Policy and Charging Enforcement Function (PCEF) node from a Policy and Charging Rules Function (PCRF) node, the one or more policy and charging rules, and enforcing the one or more policy and charging rules at the PCEF node.

7. The method of claim 2,
   wherein the different types of accesses using the unlicensed spectrum resource, the licensed spectrum resource, and the combination thereof comprises a standalone LTE-Unlicensed (LTE-U), an LTE WLAN Aggregation (LWA), and a Licensed Assisted Access (LAA), and
   wherein said one or more traffic routing rules specify which traffic is to be routed over any one of the standalone LTE-U access, LTE access of the LWA, WLAN access of the LWA, LTE and WLAN combined access of the LWA, licensed bearer of the LAA, unlicensed bearer of the LAA, and licensed and unlicensed combined bearer of the LAA.

8. The method of claim 1, wherein the different types of accesses using the unlicensed spectrum resource, the licensed spectrum resource, and the combination thereof comprises a standalone LTE-Unlicensed (LTE-U), an LTE WLAN Aggregation (LWA), and a Licensed Assisted Access (LAA).

9. The method of claim 1, wherein the UE and RAN information related to the different types of accesses is collected by a RAN node and transmitted to a core network (CN) node in charge of generating the policy and charging information.

10. An apparatus for policy and charging control the apparatus comprising:
    a generating unit configured to generate policy and charging information based, at least, on User Equipment (UE) and Radio Access Network (RAN) information related to different types of accesses, the different types of accesses using an unlicensed spectrum resource, a licensed spectrum resource, and a combination thereof, wherein the UE and RAN information related to the different types of accesses comprises capability of a UE for supporting the different types of accesses and capability of a RAN for supporting the different types of accesses; and
    a performing unit configured to perform the policy and charging control based on the policy and charging information.

11. The apparatus of claim 10, wherein the policy and charging information comprises:
    one or more traffic routing rules specifying which traffic is to be routed over any one of the licensed spectrum resource and/or the unlicensed spectrum resource of the different types of accesses; and
    one or more policy and charging rules specifying the policy and charging control for the traffic routed over any one of the licensed spectrum resource and/or the unlicensed spectrum resource of the different types of accesses.

12. The apparatus of claim 11, wherein said performing unit is configured to perform the policy and charging control by forwarding the one or more traffic routing rules to the UE, to be enforced therein, through a RAN node and enforcing the one or more policy and charging rules.

13. The apparatus of claim 12, wherein said performing unit is configured to perform the policy and charging control by also enforcing the one or more traffic routing rules.

14. The apparatus of claim 11, wherein the different types of accesses using the unlicensed spectrum resource, the licensed spectrum resource, and the combination thereof comprises a standalone LTE-Unlicensed (LTE-U), an LTE WLAN Aggregation (LWA), and a Licensed Assisted Access (LAA), and
 wherein said one or more traffic routing rules specify which traffic is to be routed over any one of the standalone LTE-U access, LTE access of the LWA, WLAN access of the LWA, LTE and WLAN combined access of the LWA, licensed bearer of the LAA, unlicensed bearer of the LAA, and licensed and unlicensed combined bearer of the LAA.

15. The apparatus of claim 10, wherein the different types of accesses using the unlicensed spectrum resource, the licensed spectrum resource, and the combination thereof comprises a standalone LTE-Unlicensed (LTE-U), an LTE WLAN Aggregation (LWA), and a Licensed Assisted Access (LAA).

16. The apparatus of claim 10, wherein the UE and RAN information related to the different types of accesses is collected by a RAN node.

17. The apparatus of claim 10, wherein the generating unit is a Policy and Charging Rules Function (PCRF) node and the performing unit is a Policy and Charging Enforcement Function (PCEF) node.

18. A core network node for generating information for policy and charging control, the core network node comprising:
 a generator unit configured to generate policy and charging information based, at least, on User Equipment (UE) and Radio Access Network (RAN) information related to different types of accesses, the different types of accesses using an unlicensed spectrum resource, a licensed spectrum resource, and a combination thereof, wherein the UE and RAN information related to the different types of accesses comprises capability of a UE for supporting the different types of accesses and capability of a RAN for supporting the different types of accesses; and
 a transmitter configured to transmit the policy and charging information to a further core network node in charge of performing the policy and charging control.

19. The core network node of claim 18, wherein the policy and charging information comprises:
 one or more traffic routing rules specifying which traffic is to be routed over any one of the licensed spectrum resource and/or the unlicensed spectrum resource of the different types of accesses; and
 one or more policy and charging rules specifying the policy and charging control for the traffic routed over any one of the licensed spectrum resource and/or the unlicensed spectrum resource of the different types of accesses.

20. The core network node of claim 18, further comprising a receiver configured to receive, from a RAN node, the UE and RAN information related to the different types of accesses.

21. The core network node of claim 18, wherein the core network node is a Policy and Charging Rules Function (PCRF) node.

22. A core network node for performing policy and charging control, the core network node comprising:
 a receiver configured to receive, from a further core network node in charge of generating information for the policy and charging control, policy and charging information based, at least, on User Equipment (UE) and Radio Access Network (RAN) information related to different types of accesses, the different types of accesses using an unlicensed spectrum resource, a licensed spectrum resource, and a combination thereof, wherein the UE and RAN information related to the different types of accesses comprises capability of a UE for supporting the different types of accesses and capability of a RAN for supporting the different types of accesses; and
 an enforcer unit configured to perform the policy and charging control based on the received policy and charging information.

23. The core network node of claim 22, wherein the received policy and charging information comprises:
 one or more traffic routing rules specifying which traffic is to be routed over any one of the licensed spectrum resource and/or the unlicensed spectrum resource of the different types of accesses; and
 one or more policy and charging rules specifying the policy and charging control for the traffic routed over any one of the licensed spectrum resource and/or the unlicensed spectrum resource of the different types of accesses.

24. The core network node of claim 23, further comprising a transmitter configured to forward, to the UE through a RAN node, the one or more traffic routing rules, wherein the enforcer unit is further configured to enforce the one or more policy and charging rules.

25. The core network node of claim 24, wherein the enforcer unit is further configured to enforce the one or more traffic routing rules.

26. The core network node of claim 24, wherein the one or more policy and charging rules are enforced to trigger a flexible charging for the traffic routed over at least one of the licensed spectrum resource and the unlicensed access spectrum resource.

27. The core network node of claim 22, wherein the core network node is a Policy and Charging Enforcement Function (PCEF) node.

* * * * *